United States Patent [19]
Burgin

[11] 3,811,398
[45] May 21, 1974

[54] TWIN KEEL JET BOAT

[76] Inventor: Kermit H. Burgin, R.R. No. 1, Whitestown, Ind. 46075

[22] Filed: Feb. 2, 1973

[21] Appl. No.: 329,061

[52] U.S. Cl. .................. 115/16, 114/61, 114/67 A, 115/11, 115/14
[51] Int. Cl. ....................... B63h 11/02, B63b 1/34
[58] Field of Search ..... 114/61, 65 R, 66.5 P, 67 R, 114/67 A, 56, 66.5 R; 115/11, 12 R, 12 A, 14, 16; 60/221, 222

[56] References Cited
UNITED STATES PATENTS

| | | | |
|---|---|---|---|
| 3,481,296 | 12/1969 | Stephens | 114/67 A |
| 3,288,100 | 11/1966 | Cox et al. | 114/67 A X |
| 3,580,210 | 5/1971 | Svensen | 60/221 X |
| 1,824,313 | 9/1931 | Vogler | 114/67 A |

FOREIGN PATENTS OR APPLICATIONS

| | | | |
|---|---|---|---|
| 3,766 | 1/1911 | Great Britain | 115/11 |

Primary Examiner—Lloyd L. King
Assistant Examiner—Randolph A. Reese
Attorney, Agent, or Firm—Hood & Coffey

[57] ABSTRACT

A boat having a bottom, twin longitudinal depending keels adjacent the lateral edges of the bottom and extending substantially throughout the length of said bottom, each keel being formed to provide a passageway extending longitudinally therethrough and having an intake port adjacent its bow end and an exhaust port adjacent its stern end. A pump is disposed in each passageway intermediate its ends to draw water into its intake port and force it out through its exhaust port. An engine is disposed in the boat, and a drive train, including a reversible transmission, is provided for drivingly connecting each pump to the engine. Also drivingly connected to the engine are rotary beaters which keep trash out of the intake ports. The bottom of the boat is formed with a well having closed top, sides and ends. A compressor driven by the engine is provided for delivering continuously a flow of primarily gaseous substance under pressure to the well. The well is covered by a panel or panels arranged to vent the gaseous substance downwardly and rearwardly.

11 Claims, 12 Drawing Figures

PATENTED MAY 21 1974 3,811,398

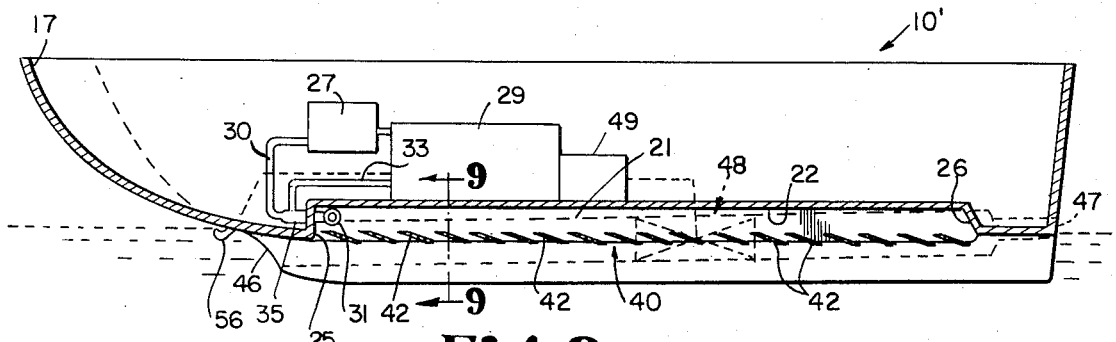
Fig.8
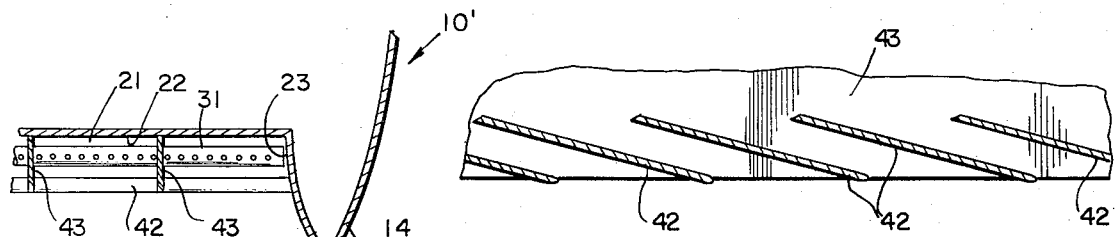
Fig.9
Fig.10
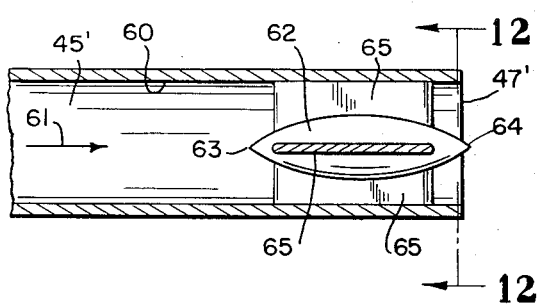
Fig.11
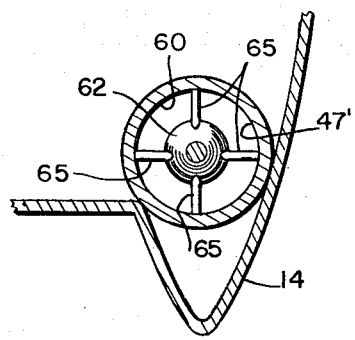
Fig.12

TWIN KEEL JET BOAT

The present invention relates to boats, and a major objective thereof is to provide a jet boat which will be stable and safe, but which will ride high in the water with little resistance to forward motion and with very small draft as a high-performance boat. A further object is to provide a jet boat which has twin longitudinal depending keels adjacent the lateral edges of its bottom and extending substantially throughout the length of the bottom with a jet system disposed in each keel. Particularly, each keel is formed to provide a passageway extending longitudinally therethrough and having an intake port adjacent its bow end and an exhaust port adjacent its stern end. A pump is disposed in each passageway intermediate its ends to draw water into the intake port and force it out through the exhaust port, each pump being drivingly connected to the engine disposed in the boat. Preferably, this driving connection is made through a reversible transmission such that the pumps can be driven to draw water into the stern end ports and force it out through the bow end ports to move the boat rearwardly.

A further object of my present invention is to provide a boat having in its bottom a downwardly open cavity of substantial area and provided with means for continuously delivering to that cavity air, or a mixture of air and liquid, under such superatmospheric pressure as to exert a significant lifting effect upon the boat. I cover this cavity or well with panel means such as a plurality of longitudinally spaced apart, transversely extending louvers inclining downwardly and rearwardly to vent the gaseous substance downwardly and rearwardly.

Another object is to provide a boat which is well balanced such that it will stay level. This is accomplished in part by placing the heavy items, such as the engine, transmission and compressor, above the cavity or well into which the gaseous substance is pumped under pressure to provide a lifting effect.

To the accomplishment of the above and related objects, this invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 8 is a somewhat diagrammatic side elevation view of a different embodiment of the present invention;

FIG. 9 is a fragmentary sectional view taken generally along the line 9—9 in FIG. 8;

FIG. 10 is a fragmentary enlarged view of the louvered panel covering the well in the bottom of the boat of FIG. 8;

FIG. 11 is a fragmentary sectional view of a different type of passageway for the water jet in a keel; and FIG. 12 is a fragmentary sectional view taken generally along the line 12—12 in FIG. 11.

Figure 1:
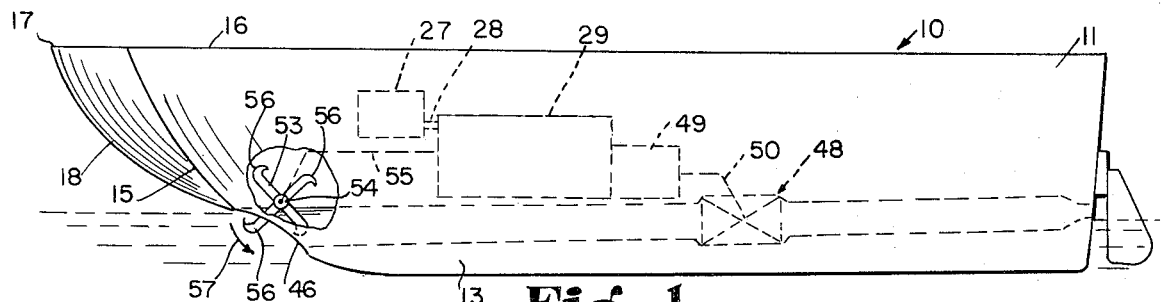
FIG. 1 is a somewhat diagrammatic side elevation of a boat constructed in accordance with the present invention.

Referring more particularly to the drawings, the reference numeral 10 indicates generally a boat embodying the present invention. The illustrative and preferred hull 11 is formed to provide a bottom 12 laterally flanked by identical, longitudinal, depending keels 13 and 14. The forward end of each keel is curved upwardly and forwardly, as at 15, to the level of the deck 16. In the form of the hull illustrated, the sharpened prow 17 reaches forwardly beyond the forward ends of the keels 13 and 14, and is likewise curved upwardly and forwardly as at 18 to the deck level. It will be appreciated that this prow and keel structure is merely illustrative, and that other structures may be used in boats constructed in accordance with the present invention.

Figure 2:
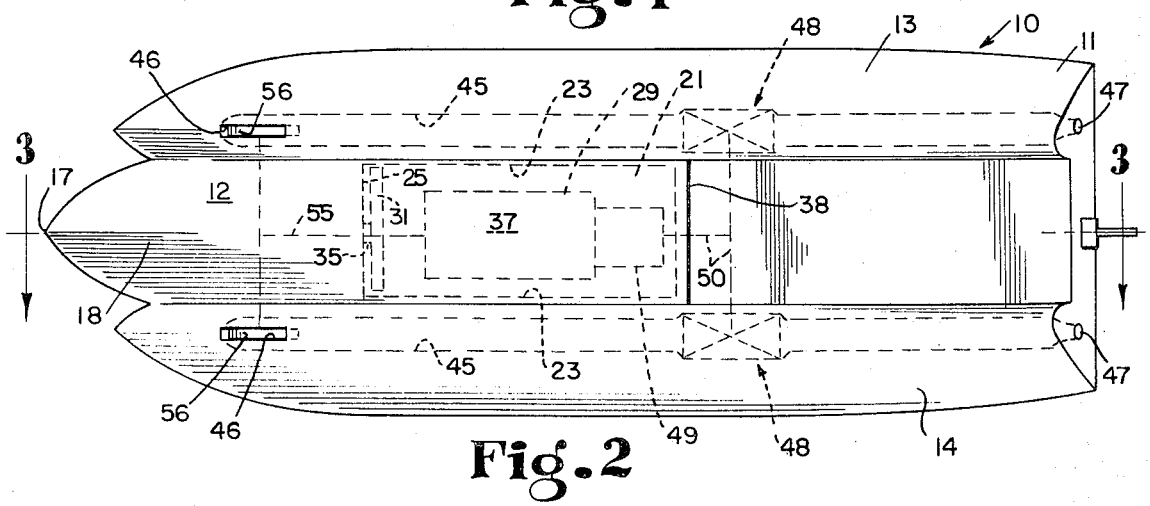
FIG. 2 is a bottom plan view thereof.
Figure 3:
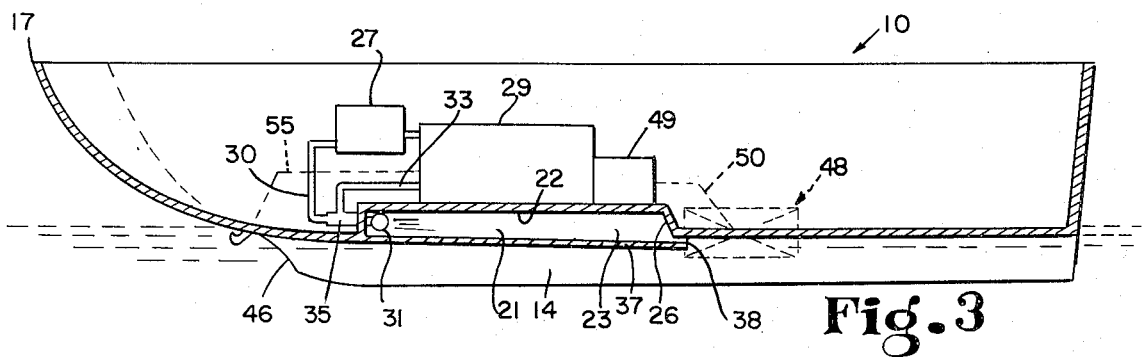
FIG. 3 is a sectional view of the boat taken along the line 3—3 in FIG. 2.
Figure 4:
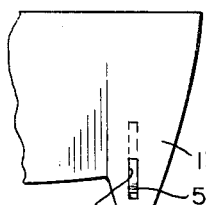
FIG. 4 is a fragmentary front side end view of a keel.

The boat 10 of FIGS. 1-3 is provided with a downwardly opening cavity 21 defined by a ceiling or top wall 22, lateral walls 23 and, a forward wall 25 and an after wall 26. The lateral walls 23 and forward wall 25 may preferably be substantially vertical; 24 and 25 may preferably be substantially vertical; and the after wall 26 may incline downwardly and rearwardly in the manner illustrated.

At any suitable point within the boat, and preferably below the deck 16, there is mounted a high-volume air compressor 27 operated through a drive train 28 from a prime mover 29 which may, and ordinarily will, be an internal combustion marine engine of conventional type. Of course, the compressor may be drivingly connected to the engine through a clutch (not shown) incorporated in the drive train 28. Conduit means 30 leads from the outlet port of the compressor 27 tp deliver compressed air to a header 31 preferably mounted upon the forward wall 25 of the cavity 21, extending transversely of the cavity and provided with multiple ports preferably opening rearwardly into the cavity or well 21.

Marine internal combustion engines are conventionally provided with means for circulating coolant water therethrough, for mixing the spent water with the exhaust gases from the engine and for discharging the mixed gases and water through a tailpipe. As shown in the drawings, the tailpipe 33 (FIG. 3) may extend to enter a manifold 35 whereby the compressed air flowing through the manifold toward the header 31 will entrain the exhaust mixture from the engine 29. The exhaust mixture thus is delivered to the interior of the cavity or well 21, whereby the exhaust noises are greatly muffled. It is an important object of my invention greatly to muffle the sound of the engine exhaust.

This technique of delivering a flow of primarily gaseous substance under pressure to the interior of the well 21 is well described in my pending U.S. Pat. application Ser. No. 259,002 filed June 2, 1972 now abandoned. The boat illustrated in my pending U.S. Pat. application Ser. No. 259,002 is such that the bottom of the well 21 is open.

The boat 10 of my present application is constructed such that panel means 37 covers the bottom of the well.

In the embodiment of FIGS. 1-3, the illustrative panel means 37 terminates with a rear edge 38 disposed to the rear of and below the bottom edge of the after wall 26 such that the compressed gaseous substance leaving the well is vented rearwardly and downwardly from the well.

In the embodiment of FIGS. 1-3, the engine 29 and compressor 27 are disposed generally above the well 21 which is positioned in the forward portion of the boat 10.

In the embodiment of FIGS. 8-10, the boat 10' is constructed such that the well 21 is significantly longer than the well 21 in the boat 10 of FIGS. 1-3. The longer well 21 (FIGS. 8-10) is covered by panel means 40 which, in the illustrative embodiment, is provided by a plurality of longitudinally spaced apart, transversely extending louvers 42 inclining rearwardly and downwardly (FIG. 10) to vent the gaseous substance rearwardly and downwardly. Of course, the well with the gaseous substance under pressure therein provides the buoyancy effect described in my pending U.S. Pat. application Ser. No. 259,002. The louvers 42 tend uniformly to distribute the venting of the gaseous substance throughout the length of the well 21. I believe this uniform distribution will produce a much quieter operation (reduction of exhaust noise) as well as provide a uniform layer of gaseous substance which will reduce the drag on the boat.

Further, in the illustrative embodiment of FIGS. 8-10, the well 21 is divided into three longitudinally extending compartments by a pair of transversely spaced apart, longitudinally extending rigid walls 43 depending from the top 22 and providing lower, longitudinal edge portions engaging the louvers 42. It will be appreciated that these rigid walls 43 strengthen the louvers 42. The header 31, of course, extends across the forward end of each compartment to deliver the gaseous substance to each compartment. The division of the well into three longitudinal compartments also contributes to the uniformity of venting.

In both embodiments, each keel 13, 14 is formed to provide a passageway 45 extending longitudinally therethrough and having an intake port 46 adjacent its bow end and an exhaust port 47 adjacent its stern end. A conventional water jet pump 48 is disposed in each said passageway 45 intermediate its ends to draw water into its intake port and force it out through its exhaust port. Each such pump 48 may preferably be drivingly connected to the engine 29 by means of a conventional drive train including a reversible transmission 49 and drive elements 50. Thus, the boat of the present invention is a jet boat including a pair of separate jet systems, one in each depending keel 13, 14. The reversible transmission 49 is preferable so that the pumps 48 can be driven to draw water into the exhaust ports 47 to force it out through the intake ports 46 to move the boat rearwardly.

One of the basic problems with a jet boat is to keep trash out of the jet system. The boat 10 includes, in each passageway 45, adjacent its said intake port 46, a rotary beater 53 effective, when driven, to keep trash out of the intake port 46. The illustrative rotary beaters 53 are (FIGS. 1-3) journal mounted for rotation about a transverse axis 54 and drivingly connected either to the engine 29 or to the transmission 49 by means of a conventional drive train indicated diagrammatically at 55.

Further, in the embodiment of FIGS. 1-3, each intake port is longitudinally elongated and disposed in the leading edge of each keel which is upwardly and forwardly curved at 15 as mentioned above. Each beater is journal mounted such that the distal end portions 56 of its outwardly extending arms move in an arc through the adjacent intake port 46 when the beater is driven. In the illustrative embodiment, the distal end portion 56 of each said arm is formed to extend peripherally in the direction opposite to the direction of rotation (arrow 57 in FIG. 1) of the beater to knock trash away from its associated intake port 46.

Figures 5, 6:
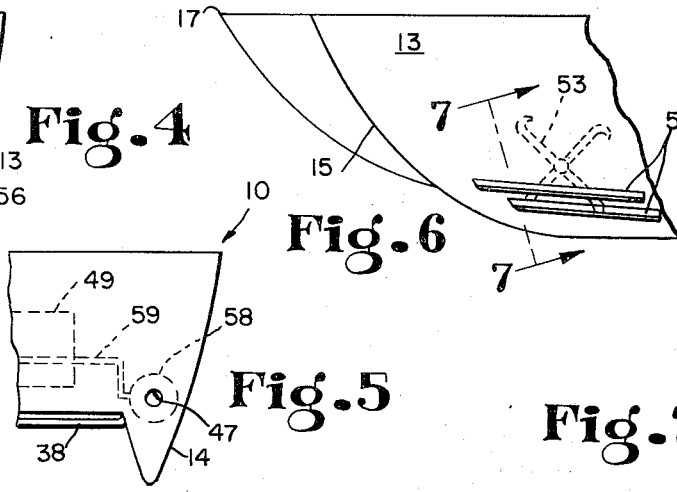
FIG. 5 is a rear side end view of a keel.
FIG. 6 is a fragmentary elevation view of the bow end portion of a keel showing a different type of inlet port.
Figure 7:
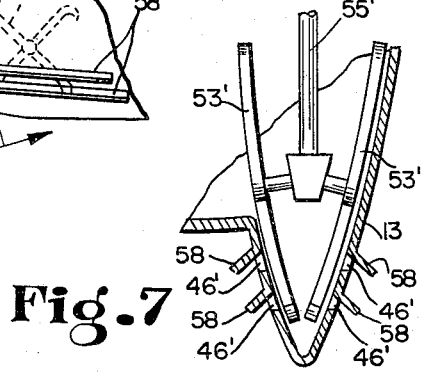
FIG. 7 is a fragmentary sectional view, enlarged, taken along the line 7—7 of FIG. 6.

In the embodiment of FIGS. 6 and 7, each keel is provided with a plurality of intake ports 46' in each of its depending side walls, each port 46' being a longitudinally elongated, vertically narrow slot. It will be seen that the side walls of the keels are formed to provide outwardly and downwardly extending louvers extending along and above the intake ports 46'. These louvers also serve to keep trash out of the intake ports. Rotary beaters 53' are disposed adjacent the side walls of the keel to beat trash away from the intake ports 46'.

Turning now to FIGS. 11 and 12, it will be seen that I have illustrated a different structure for providing a venturi effect at the exhaust end, i.e., stern end portion, of the water passageway 45' in each keel. Water jet passageways are conventionally reduced in cross section by a venturi section to provide increased velocity of the water flow. Such conventional structures for increasing the water velocity produce cavitational effects which reduce efficiency. It is my concept to provide a passageway 45' having a stern end portion 60 through which the water is exhausted in the direction of the arrow 61 through the exhaust port 47' and which is generally circular in cross section. I then place means for constricting the flow of the water through the stern end portion, my constricting means including a concentrically disposed, generally cylindrically shaped body 62 having concentrically conically shaped opposite end portions 63, 64, and radially and longitudinally extending fins 65 supporting the body in the passageway. In the illustration, I show four radially and longitudinally extending fins 65 which, I believe, tend to break up the cavitational effect to direct the water longitudinally. Of course, the body 62 reduces the cross sectional area of the stern end portion of the passageway, i.e., the portion adjacent the exhaust port 47', to increase the water velocity at that point.

It will be appreciated, from viewing FIGS. 1 and 8, that the intake ports 46 are shown just below the surface of the water while the exhaust ports 47 are above the surface of the water. This condition is achieved because of the above described lifting effect of the well 21 and the air compressor 27 and because the exhaust ports 47 are higher than the intake ports 46. It will be seen that the passageways between the intake ports 46 and exhaust ports 47 incline upwardly and rearwardly relative to the well 21 or its top 22 as well as relative to the bottom edges of the keels.

I claim:

1. A boat having a bottom, twin longitudinal depending, laterally relatively narrow keels adjacent the lateral edges of said bottom and extending substantially throughout the length of said bottom, each said keel being formed to provide a passageway extending longitudinally therethrough and having an intake port adjacent its bow end and an exhaust port adjacent its stern end, said passageway being closed except for its intake port and exhaust port, a pump disposed in each said passageway intermediate its ends to draw water into said intake port and force it out through said exhaust port to propel said boat, an engine disposed in said boat, means for drivingly connecting each said pump to said engine, and, in each said passageway adjacent its said intake port, a rotary beater effective, when driven, to keep trash out of said intake port, and means for drivingly connecting each said beater to said engine.

2. The boat of claim 1 in which said intake port is longitudinally elongated, each said beater having outwardly extending arms, the distal end portions of which move in an arc through the adjacent intake port when said beater rotates.

3. The boat of claim 1 in which the leading edge of each keel is upwardly and forwardly curved, each said intake port being longitudinally elongated and disposed in said leading edge, each said beater being journal mounted on a transversely extending axis and having outwardly extending arms, the distal end portions of which move in an arc through the adjacent intake port when said beater is driven.

4. The boat of claim 3 in which the distal end portion of each said arm is formed to extend peripherally in the direction opposite to the direction of rotation of said beater to knock trash away from its associated intake port.

5. A boat having a bottom, twin longitudinal depending, laterally relatively narrow keels adjacent the lateral edges of said bottom and extending substantially throughout the length of said bottom, each said keel being formed to provide a passageway extending longitudinally therethrough and having an intake port adjacent its bow end and an exhaust port adjacent its stern end, said passageway being closed except for its intake port and exhaust port, a pump disposed in each said passageway intermediate its ends to draw water into said intake port and force it out through said exhaust port to propel said boat, an engine disposed in said boat, means for drivingly connecting each said pump to said engine, said bottom being formed with a well having closed top, sides and ends to provide a buoyancy chamber, a panel covering said well, and means for continuously delivering to the interior of said well a flow of primarily-gaseous substance under pressure, said delivery means being drivingly connected to said engine, said panel being positioned relative to said well to vent the gaseous substance rearwardly.

6. The boat of claim 5 in which said panel extends rearwardly to terminate below and to the rear of the bottom edge of the stern end of said well.

7. The boat of claim 6 in which said engine and said means for delivering said primarily-gaseous substance are disposed generally above said well.

8. The boat of claim 5 in which said engine and said means for delivering said primarily-gaseous substance are disposed generally above said well.

9. The boat of claim 8 in which said well and the engine thereabove are positioned in the forward portion of said boat, and said pumps are disposed in said passageways rearwardly of said well.

10. The boat of claim 5 including, in each said passageway adjacent its said intake port, a rotary beater effective, when driven, to keep trash out of said intake port, and means for drivingly connecting each said beater to said engine.

11. A boat having a bottom formed with a well having closed top, sides and ends providing a buoyancy chamber, panel means covering said well, and means for continuously delivering to the interior of said well a flow of primarily-gaseous substance under pressure, said panel means being positioned relative to said well to vent such gaseous substance rearwardly and downwardly, said boat having twin longitudinal depending, laterally relatively narrow keels adjacent the lateral edges of said bottom, said sides of said well being provided by the inner upper side edge portions, respectively, of said keels, each said keel being formed to provide a passageway extending longitudinally therethrough and having an intake port adjacent its bow end and an exhaust port adjacent its stern end, a pump disposed in each said passageway intermediate its ends to draw water into said intake port and force it out through said exhaust port, an engine disposed in said boat, means for drivingly connecting each said pump to said engine, and means for drivingly connecting said delivery means to said engine, said well and delivery means being effective to raise said boat in the water so that said intake ports are just below the surface of the water while said exhaust ports are above the surface of the water.

* * * * *

PO-1050

UNITED STATES PATENT OFFICE
CERTIFICATE OF CORRECTION

Patent No. 3,811,398  Dated  May 21, 1974

Inventor(s) Kermit H. Burgin

It is certified that error appears in the above-identified patent and that said Letters Patent are hereby corrected as shown below:

Column 1, line 1, "beats" should be -- boats --;
Column 2, line 27, cancel "24 and 25 may"; line 28, cancel "preferably be substantially vertical;"; line 39, "tp" should be -- to --.

Signed and sealed this 29th day of October 1974.

(SEAL)
Attest:

McCOY M. GIBSON JR.
Attesting Officer

C. MARSHALL DANN
Commissioner of Patents